United States Patent [19]

Brennan et al.

[11] Patent Number: 4,857,485

[45] Date of Patent: Aug. 15, 1989

[54] OXIDATION RESISTANT FIBER REINFORCED COMPOSITE ARTICLE

[75] Inventors: John J. Brennan, Portland; George K. Layden, Hartford; Karl M. Prewo, Vernon, all of Conn.

[73] Assignee: United Technologies Corporation, Hartford, Conn.

[21] Appl. No.: 108,855

[22] Filed: Oct. 14, 1987

[51] Int. Cl.$^4$ .................. C03L 10/04; C04B 35/56
[52] U.S. Cl. .................................... 501/7; 501/9; 501/95; 501/67; 501/69; 501/72
[58] Field of Search ............... 501/6, 7, 45, 67, 69, 501/72

[56] References Cited

U.S. PATENT DOCUMENTS

| | | | |
|---|---|---|---|
| 4,324,843 | 4/1982 | Brennan et al. | 428/697 |
| 4,341,826 | 7/1982 | Prewo et al. | 428/35 |
| 4,399,231 | 8/1983 | Prewo et al. | 501/95 |
| 4,410,635 | 10/1983 | Brennan et al. | 501/7 |
| 4,412,854 | 11/1983 | Layden | 501/95 |
| 4,464,192 | 8/1984 | Layden et al. | 501/95 |
| 4,485,179 | 11/1984 | Brennan et al. | 501/32 |
| 4,588,699 | 5/1986 | Brennan et al. | 501/95 |
| 4,589,900 | 5/1986 | Brennan et al. | 501/95 |

OTHER PUBLICATIONS

McKee, "The Oxidation of Dispersed Refractory Metal Compounds and Their Behavior as Carbon Oxidation Catalysts", Carbon, vol. 24, No. 3, pp. 331–336 (1986).
Ehrburger et al, "Inhibition of the Oxidation of Carbon—Carbon Composite by Boron Oxide", *Carbon* vol. 24, No. 4, pp. 495–499 (1986).

*Primary Examiner*—William R. Dixon, Jr.
*Assistant Examiner*—Karl Group
*Attorney, Agent, or Firm*—Kevin E. McVeigh

[57] ABSTRACT

A silicon carbide fiber reinforced glass-ceramic matrix composite article is disclosed. The matrix is a lithium alumino silicate glass-ceramic composition which may include from 1 to 5 weight percent $B_2O_3$. The fiber reinforced glass-ceramic matrix composite article exhibits both high flexural strength at elevated temperatures and oxidative stability at elevated temperatures in an oxidizing environment.

2 Claims, No Drawings

OXIDATION RESISTANT FIBER REINFORCED COMPOSITE ARTICLE

The Government has the rights in this invention pursuant to Contract No. N00014-82-C-0096 awarded by the Department of the Navy.

DESCRIPTION

1. Technical Field

The field of art to which this invention pertains is that of fiber reinforced composite articles, particularly fiber reinforced composite articles for high temperature applications.

2. Background Art

Silicon carbide fiber reinforced glass-ceramic matrix composites for high temperature applications are known. Silicon carbide fiber reinforced glass-ceramic matrix composites are characterized by high flexural strength at elevated temperatures. The high flexural strength of a silicon carbide fiber reinforced glass-ceramic matrix composite article may deteriorate when the article is exposed to elevated temperature in an oxidizing environment.

What is needed in the art is a silicon carbide fiber reinforced glass-ceramic matrix composite article which overcomes the above difficulty.

DISCLOSURE OF THE INVENTION

A fiber reinforced composite article is disclosed. In one embodiment the article comprises from about 20 volume percent to about 60 volume percent silicon carbide fibers, and from about 40 volume percent to about 80 volume percent glass-ceramic matrix. The glass-ceramic matrix has from about 60 weight percent to about 75 weight percent silicon dioxide ($SiO_2$), from about 15 weight percent to about 25 weight percent alumina ($Al_2O_3$), from about 1.5 weight percent to about 5 weight percent lithium oxide ($Li_2O$), from about 1 weight percent to about 5 weight percent MgO, up to about 3 weight percent $ZnO_2$, up to about 3 weight percent $As_2O_3$, and from about 2 weight percent to about 5 weight percent boron trioxide ($B_2O_3$). The fiber reinforced composite article exhibits both high flexural strength at elevated temperatures and oxidative stability at elevated temperatures in an oxidizing environment.

In another embodiment the article comprises from about 20 volume percent to about 60 volume percent silicon carbide fibers and from about 40 volume percent to about 80 volume percent glass-ceramic matrix. The glass-ceramic matrix has from about 60 weight percent to about 75 weight percent $SiO_2$, from about 15 weight percent to about 25 weight percent $Al_2O_3$, from about 1.5 weight percent to about 5 weight percent $Li_2$, from about 1 weight percent to about 5 weight percent MgO, from about 1 weight percent to about 3 weight percent $ZrO_2$, from about 0.4 weight percent to about 2 weight percent $Na_2O$, from about 0.05 weight percent to about 0.5 weight percent $K_2O$, from about 0.5 weight percent to about 3 weight percent $As_2O_3$, up to about 2 weight percent ZnO, up to about 2 weight percent BaO, up to about 1 weight percent $Nd_2O_3$, and from about 1 weight percent to about 5 weight percent $B_2O_3$ where the combined amount of ZnO, BaO, $Na_2O$, $K_2O$ and $As_2O_3$ is between about 0.2 weight percent and about 3 weight percent.

The foregoing and other features and advantages of the present invention will become more apparent from the following description.

BEST MODE FOR CARRYING OUT THE INVENTION

The silicon carbide fiber of the present invention may be any continuous or discontinuous silicon carbide fiber. While silicon carbide fibers are the preferred reinforcement for use in the practice of the present invention, any fiber reinforcement which exhibits a carbon rich interfacial layer after fabrication of the composite article of the present invention may be suitable. A carbon rich layer may be applied (e.g., by chemical vapor deposition) to the surface of the fiber reinforcement, for example, SCS-6 (AVCO), HPZ (Dow Corning) or Nextel (3M) fibers, prior to the fabrication of the composite article. A carbon rich interfacial layer may be formed in situ during composite fabrication using such fibers as, for example, Nicalon ® (Nippon Carbon Co.), MPDZ (Dow Corning) or Tyranno (UBE) fibers. A silicon carbide fiber found to be particularly suitable for use with the present invention is known as Nicalon ® (Nippon Carbon Company). Nicalon ® fiber is available as a yarn having about 500 fibers per tow with an average fiber diameter of about 10 microns. The fiber has an average tensile strength of about 2000 MPa ($3 \times 10^5$ psi) and an elastic modulus of about 221 GPa ($32 \times 10^6$ psi).

Fiber reinforced refractory lithium alumino silicate glass-ceramic matrix composites are disclosed, in commonly assigned U.S. Pat. Nos. 4,324,843 and 4,485,179. The matrix of the article of the present invention differs from prior art refractory lithium alumino silicate glass-ceramic compositions by the addition of a selected quantity of $B_2O_3$.

In one embodiment of the present invention suitable matrix compositions expressed in terms of weight percent comprise:

| | |
|---|---|
| $SiO_2$ | 60–75 |
| $Al_2O_3$ | 15–25 |
| $Li_2O$ | 1.5–5 |
| $B_2O_3$ | 1–5 |
| MgO | 1–5 |
| ZnO | 0–2 |
| $ZrO_2$ | 0–3 |
| BaO | 0–2 |
| $Nd_2O_3$ | 0–1 |
| $Na_2O$ | 0–2 |
| $K_2O$ | 0–0.55 |
| $As_2O_3$ | 0–3 | provided that the combined amount of Zn, BaO, $Na_2O$, $K_2O$ and $AsO_3$ is between about 0.2 weight percent and 3 weight percent.

In another embodiment of the present invention, suitable matrix compositions expressed in terms of weight percent comprise:

| | |
|---|---|
| $SiO_2$ | 60–75 |
| $Al_2O_3$ | 15–25 |
| $Li_2O$ | 1.5–5 |
| MgO | 1–5 |
| $ZrO_2$ | 0–3 |
| $As_2O_3$ | 0–3 |
| $B_2O_3$ | 2–5 |

Suitable glass-ceramic compositions within the above ranges may be prepared by two methods. A conventional borosilicate glass powder (e.g. Corning 7740) may be mixed with a conventional lithium aluminosilicate glass powder composition to give a mixture having a composition within the ranges given above. Alternatively, $B_2O_3$ may be added to a pre-melted lithium aluminosilicate glass composition.

Other refractory matrices based on glass-ceramic compositions, such as magnesium alumino silicate, barium aluminosilicate, calcium aluminosilicate or matrices based on combinations of glass-ceramic materials, may be useful as the matrix of the present invention.

The term "glass-ceramic" is used herein to denote materials which may, depending upon processing parameters, comprise only glassy phase or both a glassy phase and a ceramic phase.

Articles of the present invention may be fabricated by hotpressing layers containing SiC fibers and a powdered matrix composition or by hotpressing a mixture of SiC fibers and a glass-ceramic matrix composition to consolidate the article and then, if a partially crystalline matrix is desired, heating the consolidated article to crystallize the matrix.

The article is preferably formed by laying up plies which contain reinforcing fibers and a powdered glass-ceramic matrix composition as discussed in commonly assigned U.S. Pat. No. 4,341,826, the disclosure of which is incorporated herein by reference. The layers are laid up such that the orientation of the fiber reinforcement in each ply is substantially unidirectional and the relationship between the fiber orientation of the successive plies is selected to impart the desired properties to the article. For example, an article of the present invention may be laid up of plies having fibers oriented in a reference direction, denoted herein as the "0°" direction, alternating with plies having fibers oriented at right angles to the reference direction, denoted herein as the "90°" direction.

It is preferred that the fiber reinforcement comprise a volume fraction of between about 20% and about 60% of the fiber reinforced glass-ceramic matrix composite material. It is difficult to obtain a proper distribution of fibers if the volume fraction of fiber is below about 20%, and the shear properties of the glass-ceramic matrix composite material are reduced if the volume fraction of fiber exceeds about 60 volume percent.

The laid up plies are then hotpressed at temperatures between about 1200° C. and about 1500° C. at pressures between about 250 psi to about 5 ksi for a time period of about 2 minutes to about 1 hour, wherein a shorter time period would typically correspond to a higher temperature and pressure.

After consolidation, the article may be heated to a temperature between about 800° C. to about 1200° C. for a time period of about 2 hours to about 48 hours, preferably in an inert atmosphere, such as Argon, to crystallize the matrix.

While not wishing to be bound by any particular theory, the improvement in oxidation resistance appears to be attributable to the interaction of several factors.

A carbon-rich layer forms at the fiber/matrix interface during fabrication of silicon carbide fiber reinforced glass-ceramic matrix composite articles. The carbon-rich interfacial layer is readily oxidized at temperatures above about 500° C. if exposed to an oxidant. Oxidants may come into contact with the interfacial layer through microcracks in the matrix and by diffusion of the oxidant along the interfacial layer from the microcrack sites and from the cut ends of any fibers that intersect the surface of the article. Oxidation of the interfacial layer results in deterioration of the flexural strength of the composite article.

Microcracks are formed by brittle fracture of the matrix material and may be initiated by stresses generated as the article undergoes dimensional changes when subjected to changes in temperature.

The $B_2O_3$ content of the matrix of the present invention results in a residual glassy phase that exists in somewhat greater quantity and is of lower viscosity than the glassy phase of a homologous lithium alumino silicate matrix composition which lacks the $B_2O_3$. The lower viscosity residual glassy phase inhibits microcrack formation by allowing the stresses that are generated during fabrication to be relieved by plastic flow. The lower viscosity of the glassy phase also accounts for a lowered temperature limitation with regard to load carrying ability, which is discussed below.

A film of low viscosity glass phase comprising magnesium boron alumino silicate forms on the surface of the article and around the ends of fibers that intersect the surface to provide an oxygen diffusion barrier which effectively seals the fiber/matrix interface at the cut ends of fibers that intersect the surface of the article and inhibits "pipeline" oxidation from the surface of the article along the length of the carbon rich interfacial layer.

The relative proportion of residual glassy phase to ceramic phase in the matrix of the present invention provides a matrix which exhibits a coefficient of thermal expansion which is more closely matched to the silicon fiber reinforcement of the present invention, which inhibits microcracking of the matrix by reducing the magnitude of thermal stresses generated as the composite undergoes changes in temperature.

Finally, scanning Auger analyses have indicated that boron diffuses from the matrix across the interfacial layer and into the silicon carbide fiber reinforcement. The presence of boron at the fiber/matrix interface appears to greatly improve the oxidative resistance of the carbon rich interfacial layer of those interfaces which are exposed to an elevated temperature oxidizing environment.

EXAMPLE 1

Silicon carbide fiber (Nicalon ®) reinforced glass-ceramic matrix composite test specimens were prepared using four different glass-ceramic matrix compositions. The composition expressed as weight percents of the glass-ceramic matrices are given in Table 1.

TABLE 1

|  | A | B | C |
| --- | --- | --- | --- |
| $SiO_2$ | 69.2 | 72.0 | 70.4 |
| $Al_2O_3$ | 21.1 | 16.5 | 19.3 |
| $Li_2O$ | 3.1 | 2.3 | 2.8 |
| $B_2O_3$ | — | 3.3 | 1.3 |
| MgO | 1.9 | 1.4 | 1.7 |
| ZnO | 1.1 | 0.82 | 1.0 |
| $ZrO_2$ | 1.6 | 1.2 | 1.45 |
| BaO | 0.8 | 0.6 | 0.7 |
| $Nd_2O_3$ | 0.2 | 0.15 | 0.18 |
| $Na_2O$ | 0.2 | 1.12 | 0.45 |
| $K_2O$ | 0.1 | 0.08 | 0.09 |
| $As_2O_3$ | 0.7 | 0.53 | 0.63 |

Composition A comprises a lithium aluminosilicate glass-ceramic composition.

Composition B comprises a mixture of 75% by weight of Composition A and 25% by weight borosilicate glass powder (Corning 7740).

Composition C was a mixture of 90% by weight of Composition A and 10% by weight borosilicate glass powder (Corning 7740).

Compositions B and C were formed by ball-mixing the glass-ceramic and glass powders together.

The specimens were consolidated by hotpressing at 1250° C. to 1350° C. and 1 ksi for 30 minutes. The consolidated specimens were heated at 900° C. for 16 hours in Argon to crystallize the matrix. The matrix composition and volume percent of fiber reinforcement of each type of test specimen are given in Table 2. All test specimens consisted of alternating 0° and 90° oriented plies with two successive 0° oriented plies at the surface of the article.

The room temperature flexural strength of test specimens formed from each matrix composition were tested after exposure of the article to oxygen at elevated temperatures. Results are given in Table 2.

TABLE 2

| | | RT 3 point Flex Strength (ksi) | | | | |
|---|---|---|---|---|---|---|
| Matrix Composition | Volume % Fiber | Before Oxidation | T = 450° C. | T = 600° C. | T = 750° C. | T = 850° C. |
| A | 44 | 74 | (76 @ 400° C.) | (60 @ 550° C.) | (63 @ 700° C.) | 63$^d$ |
| B | 44 | 81 | 88$^a$ | — | 80$^c$ | 89$^b$ |
| C | 49 | 86 | 74$^a$ | 73$^a$ | 80$^c$ | 75$^b$ |

$^a$After 16 hr. in flowing O$_2$ at T
$^b$After 24 hr. in flowing O$_2$ at T
$^c$After 60 hr. in flowing O$_2$ at T
$^d$After 70 hr. in flowing O$_2$ at T Test specimens having matrix composition A exhibited a drop in flexural strength after O$_2$ exposure. The drop in strength is indicative of oxidation of the carbon layer at the fiber/matrix interface.

Test specimens having matrix compositions B or C, each exhibited high flexural strength across the temperature range of interest indicating the high oxidative stability of the addition of B$_2$O$_3$.

The 3 point flexural strengths of a series of specimens was determined at elevated temperatures in air. The matrix composition, volume percent fiber and flexural strength at temperature are given in Table 3.

TABLE 3

| | | High Temperature Flex Strength (ksi) | | | | | |
|---|---|---|---|---|---|---|---|
| Matrix Composition | Vol % Fiber | 600° C. | 700° C. | 800° C. | 900° C. | 1000° C. | 1100° C. |
| A | 44 | — | 85 | 72 | 68 | 83 | 84 |
| B | 44 | 97 | 90 | 88 | 95 | 95 | 13 |
| C | 49 | 108 | 96 | 116 | 112 | 97 | 55 |

The specimens having matrix composition A exhibited high flexural strength at temperatures up to 1100° C. The specimens having matrix compositions B or C each exhibited high flexural strength at temperatures of up to 1000° C. and each exhibited a strong drop in flexural strength at temperatures in excess of 1000° C. Theses results indicate that increasing the B$_2$O$_3$ concentration of the matrix produces a less refractory composite article.

EXAMPLE 2

Samples of composite material were prepared according to the method and Example 1, except that single 0° oriented surface layers were used, having matrix compositions expressed as weight percents tabulated in Table 4.

TABLE 4

| | E | F | G | H | I |
|---|---|---|---|---|---|
| SiO$_2$ | 70.9 | 69.7 | 68.5 | 67.4 | 73.2 |
| Al$_2$O$_3$ | 21.6 | 21.2 | 20.9 | 20.5 | 16.7 |
| Li$_2$O | 3.1 | 3.1 | 3.1 | 3.0 | 2.3 |
| MgO | 2.0 | 2.0 | 1.9 | 1.9 | 1.5 |
| ZrO$_2$ | 1.6 | 1.6 | 1.6 | 1.5 | 1.12 |
| Na$_2$O | — | — | — | — | 1.12 |
| As$_2$O$_3$ | 0.7 | 0.7 | 0.7 | 0.7 | 0.525 |
| B$_2$O$_3$ | — | 1.7 | 3.3 | 5.0 | 3.4 |

Composition E comprises a lithium alumino silicate glass-ceramic.

Composition F comprises a mixture of 98.3 weight percent Composition E and 1.7 weight percent B$_2$O$_3$.

Composition G comprises a mixture of 96.7 weight percent Composition E and 3.3 weight percent B$_2$O$_3$.

Composition H comprises a mixture of 95 weight percent Composition E and 5 weight percent B$_2$O$_3$.

Composition I comprises a mixture of 75 weight percent composition E and 25 weight percent borosilicate glass (Corning 7740).

The samples were exposed to O$_2$ for 70 hours at elevated temperature. Following O$_2$ exposure the samples were subjected to 3 point flexural testing. The test results are tabulated in Table 5.

TABLE 5

| | | RT 3 point Flex Strength (ksi) | | | | |
|---|---|---|---|---|---|---|
| Matrix Composition | Volume % Fiber | Before Oxidation | After 70 hr in flowing O$_2$ @ T = | | | |
| | | | 450° C. | 550° C. | 700° C. | 850° C. |
| E | 46 | 58 | 50 | 27 | 28 | 31 |
| F | 42 | 73 | 53 | 21 | 48 | 42 |
| G | 43 | 75 | 69 | 73 | 77 | 61 |
| H | 42 | 62 | 57 | 68 | 67 | 63 |
| I | 53 | 63 | 61 | 61 | 62 | 63 |

Test specimens having matrix composition E exhibited a drop in flexural strength after O$_2$ exposure. The drop in strength is indicative of oxidation of the carbon layer at the fiber/matrix interface.

Test specimens having matrix composition E also exhibited a drop in flexural strength after O$_2$ exposure. Comparison with the results given for specimens with matrix composition C in Table 2 indicates that a B$_2$O$_3$ content of less than about 2.0 weight percent is not effective unless combined with other low melting metal oxide constituents such as $Na_2O$, $K_2O$ or ZnO.

Test specimens having matrix compositions G, H or I each exhibited high flexural strength across the entire temperature range of interest, indicating the high oxidative stability imparted by the addition of $B_2O_3$. The results for matrix composition H do not indicate any additional benefit with regard to oxidative stability associated with increasing the $B_2O_3$ concentration of the matrix above 3.3 weight percent. Since results given in Table 3 of Example 1 indicate that increasing the $B_2O_3$ concentration in the matrix tends to lower the upper temperature limit at which the composite article exhibits load bearing ability, for $B_2O_3$ matrix compositions based on matrix composition E, a $B_2O_3$ content from about 3 weight percent to about 4 weight percent is particularly preferred for achieving the purposes of the present invention.

The fiber reinforced glass-ceramic matrix article of the present invention exhibits both high load carrying ability and high oxidative stability at elevated temperatures.

While the composite article of the present invention exhibits high short term flexural strength at temperatures of up to about 1000° C., creep and stress-rupture studies indicate that the long term load bearing ability is limited to temperatures of up to about 800° C. Application of the article of the present invention at temperatures above 800° C. may be feasible under low stress conditions, however.

The article of the present invention exhibits high oxidative stability and sustains no substantial detriment in room temperature flexural strength after prolonged exposure to $O_2$ at temperatures ranging from ambient to over 800° C.

Although this invention has been shown and described with respect to detailed embodiments thereof, it will be understood by those skilled in the art that various changes in form and detail thereof may be made without departing from the spirit and scope of the claimed invention.

We claim:

1. A fiber reinforced composite article, comprising:
from about 20 volume percent to about 60 volume percent silicon carbide fibers, and
from about 40 volume percent to about 80 volume percent glass-ceramic matrix,
said glass-ceramic matrix having
from about 60 weight percent to about 75 weight percent $SiO_2$,
from about 15 weight percent to about 25 weight percent $Al_2O_3$,
from about 1.5 weight percent to about 5 weight percent $Li_2O$,
from about 1 weight percent to about 5 weight percent MgO,
up to about 3 weight percent $ZnO_2$,
up to about 3 weight percent $As_2O_3$, and
from about 2 weight percent to about 5 weight percent $B_2O_3$
said composite article exhibiting both high flexural strength at temperatures of up to about 1000° C. and oxidative stability at temperatures above about 450° C. in an oxidizing environment.

2. A fiber reinforced composite article, comprising:
from about 20 volume percent to about 60 volume percent silicon carbide fibers, and
from about 40 volume percent to about 80 volume percent glass-ceramic matrix,
said glass-ceramic matrix comprising
from about 60 weight percent to about 75 weight percent $SiO_2$,
from about 15 weight percent to about 25 weight percent $Al_2O_3$,
from about 1.5 weight percent to about 5 weight percent $Li_2O$,
from about 1 weight percent to about 5 weight percent $MgO$,
from about 1 weight percent to about 3 weight percent $ZrO_2$,
from about 0.4 weight percent to about 2 weight percent $Na_2O$,
from about 0.05 weight percent to about 0.5 weight percent $K_2O$,
from about 0.5 weight percent to about 3 weight percent $As_2O_3$,
up to about 2 weight percent ZnO,
up to about 2 weight percent BaO,
up to about 1 weight percent $Nd_2O_3$, and
from about 1 weight percent to about 5 weight percent $B_2O_3$
where the combined amount of ZnO, BaO, $Na_2O$, $K_2O$ and $As_2O_3$ is between about 0.2 weight percent and about 3 weight percent, and said composite article exhibits both high flexural strength at temperatures of up to about 1000° C. and oxidative stability at temperatures of above about 450° C. in an oxidizing environment.

* * * * *